US012802683B2

(12) United States Patent
Chun

(10) Patent No.: US 12,802,683 B2
(45) Date of Patent: Nov. 17, 2026

(54) METHOD AND APPARATUS FOR AUTOMATICALLY TRAINING SPEECH RECOGNITION SYSTEM

(71) Applicants: Hyundai Motor Company, Seoul (KR); Kia Corporation, Seoul (KR)

(72) Inventor: Chang Woo Chun, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 132 days.

(21) Appl. No.: 18/906,810

(22) Filed: Oct. 4, 2024

(65) Prior Publication Data

US 2025/0124915 A1 Apr. 17, 2025

(30) Foreign Application Priority Data

Oct. 12, 2023 (KR) ........................ 10-2023-0136176
Jul. 30, 2024 (KR) ........................ 10-2024-0101042

(51) Int. Cl.

| | |
|---|---|
| ***G10L 15/22*** | (2006.01) |
| ***G10L 15/06*** | (2013.01) |
| ***G10L 15/065*** | (2013.01) |
| ***G10L 17/04*** | (2013.01) |

(52) U.S. Cl.
CPC ............ *G10L 15/063* (2013.01); *G10L 15/22* (2013.01); *G10L 2015/0631* (2013.01)

(58) Field of Classification Search
CPC ..... G10L 15/063; G10L 15/22; G10L 15/065; G10L 17/04
USPC ..................................... 704/9, 231, 246, 251
See application file for complete search history.

(56) References Cited

U.S. PATENT DOCUMENTS 12,567,405 B1 * 3/2026 Kumar .................. G06F 40/295

* cited by examiner

*Primary Examiner* — George C Monikang
(74) *Attorney, Agent, or Firm* — MORGAN, LEWIS & BOCKIUS LLP

(57) ABSTRACT

In a method and apparatus for automatically training speech recognition system including one or more NLU engines, the method includes obtaining NLU results output by the one or more NLU engines, generating a prompt for a large-scale language model based on comparing between/among the NLU results, determining whether the NLU results are appropriate by use of a generated prompt for the large-scale language model and training the speech recognition system by use of a determination result

15 Claims, 7 Drawing Sheets

METHOD AND APPARATUS FOR AUTOMATICALLY TRAINING SPEECH RECOGNITION SYSTEM

CROSS-REFERENCE TO RELATED APPLICATION

The present application claims priority to Korean Patent Application No. 10-2023-0136176 and 10-2024-0101042, filed on Oct. 12, 2023 and Jul. 30, 2024, respectively, the entire contents of which is incorporated herein for all purposes by this reference.

BACKGROUND OF THE PRESENT DISCLOSURE

Field of the Present Disclosure

The present disclosure relates to a method and apparatus for automatically training a speech recognition system.

Description of Related Art

The description in the present section merely provides background information related to the present disclosure and does not form the related art.

As artificial intelligence techniques have recently developed, the scope of applying artificial intelligence is also expanding. Dialog systems that enable conversations with users using natural language, such as chatbots or virtual assistants, are being utilized in various fields. For a dialog system to conduct a conversation with a user, it is necessary to understand the utterance of the user, in other words, an input message, from the perspective of the dialog system. To achieve the present Natural Language Understanding (NLU), the dialogue system needs to derive the current context and the intent of a user expected in that context from the dialogue between the dialogue system and the user, and analyze the input message based on the determined current context and/or intent.

The scope of application of these speech recognition services is expanding from homes to various fields such as vehicles. Additionally, telematics technology includes various functions. Examples include real-time navigation functions, information search functions using the Internet, and functions such as optimizing an in-vehicle environment by utilizing the vehicle's location and weather information.

Speech recognition systems are widely used in everyday life, such as in smartphones, smart speakers, and vehicle infotainment systems. To build a natural language understanding system that analyzes the intent of utterances, it is necessary to design a set of expected user intent in advance, collect sentences, and train an intent classification model. However, predefined intent alone may not fully meet the constantly changing needs of users. Accordingly, an intent classification model needs to be expanded by iteratively incorporating new pieces of intent discovered in unlabeled user utterances.

To expand the intent classification model, existing methods required human evaluators to select data and collect sentences. The present method requires a manual tagging process and is time consuming and costly. Additionally, there is an issue that it is difficult to obtain consistent results when a plurality of people evaluate. Furthermore, speech recognition systems themselves contain errors, making it difficult to find misclassifications or detect new pieces of intent from speech recognition logs. Additionally, even when speech recognition and natural language processing models are trained, the utterance patterns of a user change over time, degrading model performance. Accordingly, methods and systems are needed to detect misclassifications and new pieces of intent and improve the system.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus for automatically training a speech recognition system by finding misclassifications and deriving new intent based on the results of the speech recognition system classifying intent.

The aspects of the present disclosure are not limited to those mentioned above, and other aspects not mentioned herein will be clearly understood by those skilled in the art from the following description.

According to an aspect of the present disclosure, a method for automatically training a speech recognition system including one or more NLU engines, the method including, obtaining NLU results output by the one or more NLU engines, generating a prompt for a large-scale language model based on comparing between/among the NLU results, determining whether the NLU results are appropriate by use of a generated prompt for the large-scale language model and training the speech recognition system by use of a determination result.

According to another aspect of the present disclosure, an apparatus for automatically training a speech recognition system including one or more NLU engines, the apparatus including, a memory configured to store one or more instructions and one or more processors operatively connected to the memory and configured to execute the one or more instructions stored in the memory, wherein the one or more processors, by executing the one or more instructions, perform steps including, obtaining NLU results output by the one or more NLU engines, generating a prompt for a large-scale language model based on comparing between/among the NLU results, determining whether the NLU results are appropriate by use of a generated prompt for the large-scale language model and training the speech recognition system by use of a determination result.

According to an exemplary embodiment of the present disclosure, the speech recognition system can automatically train the speech recognition system by finding misclassifications and deriving new intent based on the results of classifying the intent.

According to an exemplary embodiment of the present disclosure, the continuously changing intent of a user may be detected by automatically training the speech recognition system.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
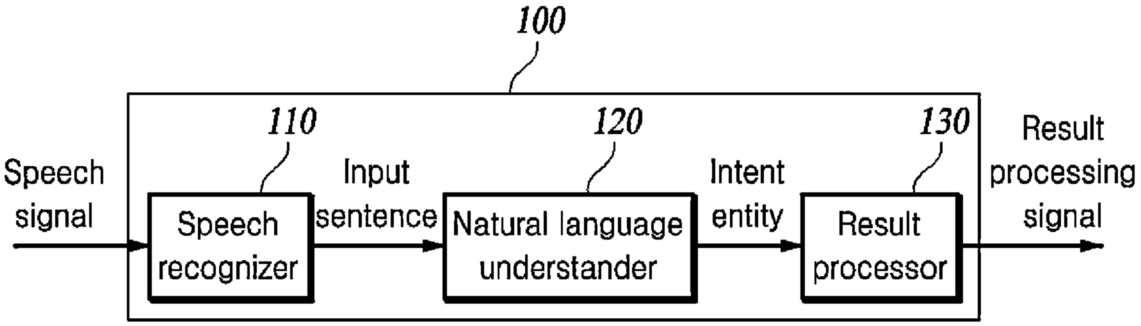
FIG. 1 is a schematic diagram illustrating a speech recognition system.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Furthermore, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted based on the contextual meanings of the related technology.

Furthermore, the terms used in the exemplary embodiments of the present disclosure are for explaining the embodiments, not for limiting the present disclosure.

Hereinafter, some exemplary embodiments of the present disclosure will be described in detail with reference to the accompanying drawings. In the following description, like reference numerals designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is directed to describe exemplary embodiments of the present disclosure, and is not intended to represent the only embodiments in which an exemplary embodiment of the present disclosure may be practiced.

FIG. 1 is a schematic diagram illustrating a speech recognition system.

Referring to FIG. 1, a speech recognition system 100 recognizes an utterance of a user, understands the recognized utterance, and provides services corresponding to the utterance of the user.

To the present end, the speech recognition system 100 includes a speech recognizer 110 that converts a speech utterance of a user into text, a natural language understander 120 which is configured to determine intent and entity included in the speech utterance of the user, and a result processor 130 which is configured to perform processing to provide results corresponding to the intent and the entity of the user.

The speech recognizer 110 may convert the utterance of the user into an input sentence using at least one speech recognition engine. Herein, the speech recognition engine may refer to a Speech to Text (STT) engine, and the speech signal may be converted into text by applying a speech recognition algorithm or neural network model to a speech signal representing the utterance of the user.

For example, the speech recognizer 110 may extract feature vectors from a user utterance by applying feature vector extraction techniques such as Cepstrum, Linear Predictive Coefficient (LPC), Mel Frequency Cepstral Coefficient (MFCC), or Filter Bank Energy.

The speech recognizer 110 may obtain recognition results by comparing the extracted feature vector with a trained reference pattern. To the present end, an acoustic model that models and compares signal characteristics of speech or a language model that models a linguistic order relationship of words or syllables corresponding to recognition vocabulary may be used.

The speech recognizer 110 may convert user utterances into text based on a model where machine learning or deep learning is applied.

In an exemplary embodiment of the present disclosure, a speech recognition result represents text obtained using a speech recognition engine.

The natural language understander 120 is configured to determine at least one of the user intent or entity included in the input sentence using at least one natural language understanding (NLU) engine. In an exemplary embodiment of the present disclosure, the intent classifier is a language model that utilizes the natural language understander 12 to understand what a user intends from an input of the user.

The natural language understander 120 may extract information such as domain, entity name, and speech act from the input sentence using the NLU engine, and recognize intent and entity according to the intent based on the extraction result. The entity may be referred to as a slot.

The NLU engine may segment the input sentence into morphemes, project the morphemes into a vector space, group the projected vectors to classify the intent according to the input sentence, and extract word components according to the intent within the input sentence as entities.

In an exemplary embodiment of the present disclosure, an NLU result refers to at least one of intent or an entity obtained using the NLU engine.

The result processor 130 may output a result signal to a vehicle, user device, or external server to perform processing to provide a service corresponding to intent of a user.

For example, when the service corresponding to the intent of the user is vehicle-related control, the result processor 130 may transmit a result signal for performing the vehicle-related control to a vehicle. As an exemplary embodiment of the present disclosure, when the service corresponding to the intent of the user is to provide specific information, the result processor 130 may search for specific information and provide the searched information to a user terminal. If necessary, information retrieval may also be performed on an external server. As an exemplary embodiment of the present disclosure, when the service corresponding to the intent of the user is to provide specific content, the result processor 130 may request transmission of the target content to an external server that provides the content. In another example, when the service corresponding to the intent of the user is the continuation of a simple dialog, the result processor 130 may be configured to generate a response to the utterance of the user and output the response visually or auditorily.

The speech recognition system 100 may be provided on an external server or a user terminal, and some of its constituents may be provided on an external server and other constituents may be provided on a user terminal. The user terminal may be a mobile device such as a smartphone, tablet PC, or wearable device, a home appliance with a user interface, or a vehicle.

The speech recognition system 100 may further include a dialogue manager that manages the overall dialog between the speech recognition system 100 and a user.

The constituents of the speech recognition system 100 are classified based on their operation or function, and all or part thereof may share memory or a processor. The speech recognition system 100 may be implemented in either a vehicle or a server. Otherwise, some of the constituents of the speech recognition system 100 may be included in a vehicle, and others may be included in a server. For example, the vehicle transmits a speech signal of a passenger to the server, the server processes the speech signal of the passenger, generates information or control commands necessary for the passenger, and transmits the information or control command to the vehicle.

Figure 2:
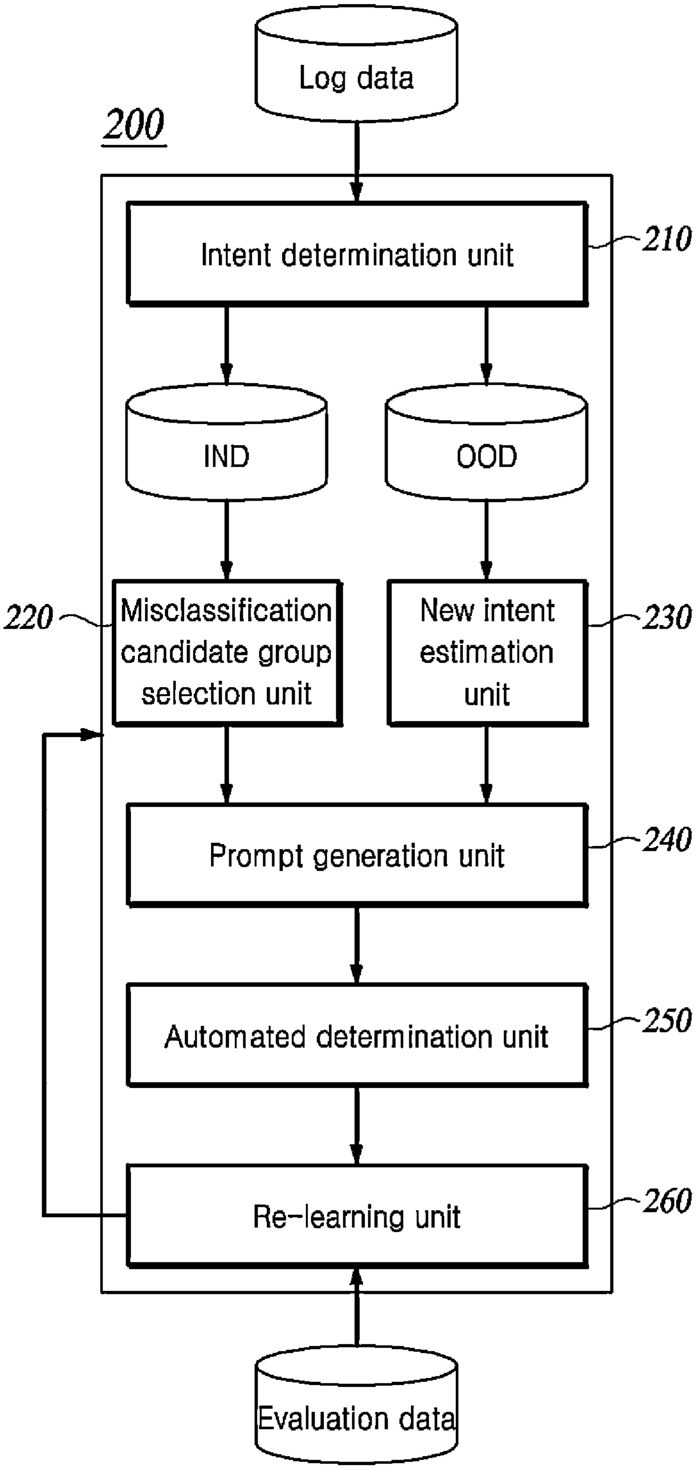
FIG. 2 is a block schematic diagram schematically illustrating an automatic learning apparatus based on a large-scale language model according to an exemplary embodiment of the present disclosure.

FIG. 2 is a block schematic diagram schematically illustrating an automatic learning apparatus based on a large-scale language model according to an exemplary embodiment of the present disclosure.

An automatic learning apparatus 200 includes a memory and a processor.

The automatic learning apparatus 200 according to an exemplary embodiment of the present disclosure may include all or part of a misclassification candidate group selection unit 220, a new intent estimation unit 230, a prompt generation unit 240, an automated determination unit 250, and a re-learning unit 260. Not all blocks illustrated in FIG. 2 are essential constituents, and some blocks included in the automatic learning apparatus 200 may be added, changed, or deleted. The constituents illustrated in FIG. 2 represent functionally distinct elements, and at least one constituent may be implemented in an integrated form in an actual physical environment.

The memory stores data and commands necessary for the operation of the automatic learning apparatus 200.

The processor is configured to control the overall operation of the automatic learning apparatus 200. The processor may be implemented as one or more processors. The processor may execute commands stored in the memory.

The processor may include an intent determination unit 210, the misclassification candidate group selection unit 220, the new intent estimation unit 230, the prompt generation unit 240, the automated determination unit 250, and the re-learning unit 260.

In an exemplary embodiment of the present disclosure, a large-scale language model may be included and used within the automatic learning apparatus 200, or may be provided outside the automatic learning apparatus 200 and used to exchange data through communication with a server.

In an exemplary embodiment of the present disclosure, the domain may receive an utterance of a user and may include 'processable utterance (In-Domain: IND)' and 'difficult-to-process utterance (Out-of-Domain: OOD)'. The IND refers to data or input that the system may process within the scope of what has already been trained. This is data that the system may accurately understand and process based on trained data within a predefined domain. The OOD refers to data or input which is outside the scope of what the system has trained. The OOD refers to data that includes new domains, patterns, or intent that the system has not presently trained. It may be difficult for the system to respond appropriately to inputs, including OOD, and difficult to predict accurately.

The intent determination unit 210 may include an intent classifier or a large-scale language model. The intent determination unit 210 may receive log data of a user and make a distinction between the IND and the OOD. The task of making a distinction between the IND and the ODD may be performed with an intent classifier or a large-scale language model. To form a distinction between the IND and the OOD, the intent determination unit 210 may train an intent classifier or a large-scale language model using labeled data.

The intent determination unit 210 may assign a temporary label to unlabeled data (pseudo-label) using a trained intent classifier or a trained large-scale language model.

The NLU engine of FIG. 1 may include an intent classifier or a large-scale language model of the intent determination unit 210. The NLU result may include IND and OOD data sets classified by the intent determination unit 210.

The misclassification candidate group selection unit 220 may select a misclassification candidate group using an intent classifier ensemble. The intent classifier ensemble refers to a method of predicting intent by connecting one or more intent classifiers in parallel. For example, for one utterance, different versions of intent classifiers may be executed in parallel to predict various pieces of intent.

The misclassification candidate group selection unit 220 may include one or more intent classifiers, where the intent classifiers refer to intent classifiers trained in advance using different methods.

In the exemplary embodiment of the present disclosure, the method of training the intent classifier may include: a first training method that trains one or more models by changing a dropout ratio of the same type of model; a second training method that utilizes the same algorithm but sets learning parameters (initialization, epoch, batch size, etc.) differently to train one or more models; a third training method that trains one or more models using different algorithms such as BERT, ALBERT, ELECTRA, and ROBERTa; and a fourth training method that includes common essential intent within the same overall intent set data set and configures other pieces of intent differently to train one or more models.

For example, the misclassification candidate group selection unit 220 may select important intent from the entire intent set. Herein, the important intent refers to intent which is common to all data sets. The misclassification candidate group selection unit 220 may be configured to generate three intent sets n1, n2, and n3 from the entire intent set N. The entire intent set N is the set of all pieces of intent that the system may understand and process. The intent sets n1, n2, and n3 contain important intent, but each contain other, less important intent. The misclassification candidate group selection unit 220 may train one or more models using the intent sets n1, n2, and n3 as data sets, respectively.

The misclassification candidate group selection unit 220 may connect one or more trained intent classifiers in parallel.

The misclassification candidate group selection unit 220 may connect one or more intent classifiers trained using, for example, the first training method in parallel. The misclassification candidate group selection unit 220 may connect one or more intent classifiers trained using, for example, the second training method in parallel. The misclassification candidate group selection unit 220 may connect one or more intent classifiers trained using, for example, the third training method in parallel. The misclassification candidate group selection unit 220 may connect one or more intent classifiers trained using, for example, the fourth training method in parallel.

The misclassification candidate group selection unit 220 may be configured to predict the intent of an utterance from the same input sentence using a trained intent classifier. Additionally, the prediction results of each intent classifier may be collected.

The misclassification candidate group selection unit 220 may evaluate how multiple the prediction results are and select a misclassification candidate group which may cause an error.

The misclassification candidate group selection unit 220 may select misclassification candidate groups that are prone to errors from the results of different intent classifiers.

In the exemplary embodiment of the present disclosure, the method of selecting misclassification candidate groups may include a first selection method to find sentences with a high possibility of misclassification by sorting the same in the order of the most different prediction results, a second selection method to find sentences with a high possibility of misclassification by grouping and sorting sentences with the most different prediction results in order of most frequent intent, and a third selection method to find sentences with a high possibility of misclassification by analyzing the similarity between sub-words of the prediction results and sorting the same in descending order of similarity.

For example, the misclassification candidate group selection unit 220 is configured to determine that the more different the intent predicted by each intent classifier connected in parallel, the higher the diversity. The misclassification candidate group selection unit 220 searches for sentences with the most diverse prediction results and selects the sentences with the most diverse results as the misclassification candidate group.

The new intent estimation unit 230 may perform contrastive learning and clustering from the data set classified as OOD by the intent determination unit 210.

The contrastive learning is a method of embedding data points in a vector space and training to place similar data closer and dissimilar data further away. The new intent estimation unit 230 may train a large-scale language model for estimating new intent using semi-supervised contrastive learning. The semi-supervised contrastive learning means conducting contrastive learning using labeled data and unlabeled data together.

The new intent estimation unit 230 may discover new intent using a large-scale language model.

In an exemplary embodiment of the present disclosure, a greedy method of a pool-based sampling method was used. Pool-based sampling is a method of training a model by selecting some pieces of data from a large unlabeled data pool. The present data pool is a ready-made, unlabeled data set. The model is allowed to select the most useful samples from unlabeled data for further learning. The greedy method refers to a method of repeatedly making the best choice in the current situation to make the optimal choice.

The new intent estimation unit 230 may select a cluster containing the largest number of samples among clusters not included in the entire intent set. Additionally, the new intent estimation unit 230 may select a representative sentence of a cluster.

Methods for selecting a representative sentence of a cluster may include a method of selecting the sentence closest to the centroid of the cluster, a method of selecting the most frequent sentence within the cluster, and a selection method in consideration of the center distance and frequency of the cluster.

The prompt generation unit 240 may be configured to generate a prompt to improve intent classification performance for making a distinction between the IND and the OOD. As an exemplary embodiment of the present disclosure, the prompt generation unit 240 may be configured to generate a prompt for intent classification by adjusting an intent usage ratio and an utterance example sampling ratio from a candidate group data set.

The prompt generation unit 240 may adjust the intent usage ratio from the entire data set and adjust the utterance example sampling ratio to generate a prompt for generating new intent. The prompt generation unit 240 may be configured to generate a prompt using a small amount of examples and reduce an input size.

The automated determination unit 250 may be configured to determine whether the misclassification prediction result is appropriate using a large-scale language model. The automated determination unit 250 may receive sentence data with a high possibility of misclassification and the prediction result of the intent classifier and determine the relationship between the actual meaning of the utterance and the prediction result. The automated determination unit 250 may analyze the meaning of the utterance and utilize the result as a prompt.

The automated determination unit 250 may detect new intent using a large-scale language model. The automated determination unit 250 may detect the new intent using the representative sentence of the cluster. Additionally, the automated determination unit 250 may find a true-negative IND utterance in OOD data. The automated determination unit 250 may be configured to generate a new intent label based on the result of detecting the new intent.

The re-learning unit 260 may continuously train the intent classifier or large-scale language model included in the automatic learning apparatus based on the results of the automated determination unit 250.

Previously, a human evaluator was needed to use continuous learning and active learning. To identify cases where the model misclassified and detect new intent, domain experts or human evaluators needed to review and annotate the data. The present process is time consuming and costly.

The automatic learning apparatus 200 of an exemplary embodiment of the present disclosure may automate the role of a human evaluator, analyze text meaning without the human evaluator, and automatically label new intent. Accordingly, the automatic learning apparatus 200 of an exemplary embodiment of the present disclosure may perform infinitely repeated learning until all pieces of data is processed. Accordingly, it may be useful in an environment where new data is continuously updated.

The automatic learning apparatus 200 has appropriate termination conditions to maintain performance and efficiency. There is a condition for repeating training until the performance of the automatic learning apparatus 200 does not fall below a preset standard. For example, when IND classification performance drops below a certain level, training is stopped.

Figure 3:
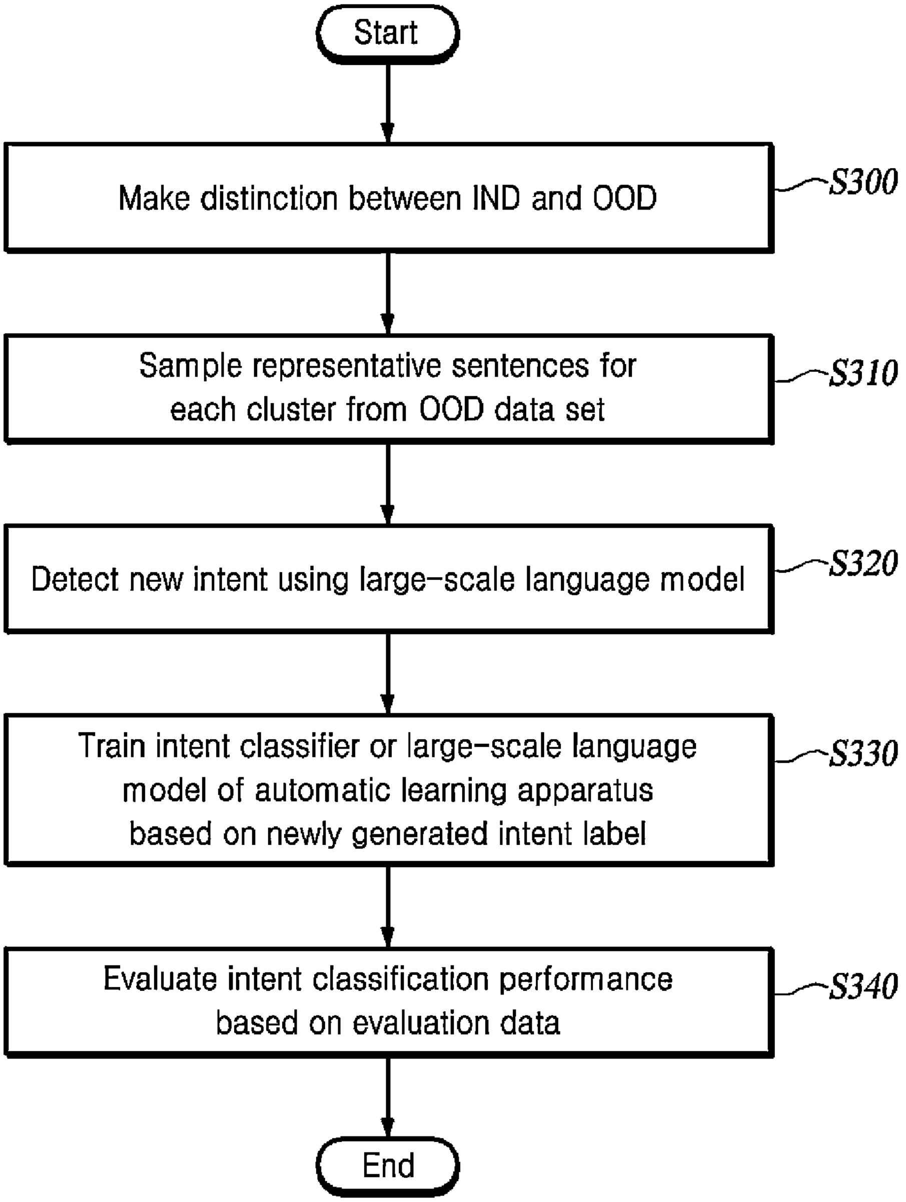
FIG. 3 is a flowchart illustrating a process for detecting new intent according to an exemplary embodiment of the present disclosure.

FIG. 3 is a flowchart illustrating a process for detecting new intent according to an exemplary embodiment of the present disclosure.

The intent determination unit 210 receives an utterance of a user and makes a distinction between the IND and the OOD (S300). The task of making a distinction between the IND and the OOD may be performed using an intent classifier or large-scale language model.

The prompt generation unit 240 may be configured to generate a prompt to improve intent classification performance for making a distinction between the IND and the OOD. The prompt generation unit 240 may be configured to generate a prompt for intent classification by adjusting the intent usage ratio from the candidate group data set and adjusting the utterance example sampling ratio.

Table 1 shows the accuracy of the intent classifier that makes a distinction between the IND and the OOD in an exemplary embodiment of the present disclosure based on a large-scale language model.

TABLE 1

| | Intent classifier | Large-scale language model(few-shot) | | | |
|---|---|---|---|---|---|
| Test set | ELECTRA | 100% | 75% | 50% | 25% |
| Top utterance | 0.994 | 0.762 | 0.702 | 0.642 | 0.616 |
| Evenly distribution | 0.917 | 0.454 | 0.4155 | 0.377 | 0.296 |

The intent classifier used the Korean-based ELECTRA-base. The intent classifier used a model that was pre-trained based on the Korean data set and fine-tuned based on the intent classification data set. The parameter settings, such as the model's layers and embedding size, were the same as those of the publicly available ELECTRA-base model. The large-scale language model used the gpt-3.5-turbo-16k-0613 model. Despite an input size of 16 k, the large-scale language model exceeded the input size limit when using 446 pieces of intent and 1 utterance sentence as an example. Accordingly, the intent classification task was performed by dividing the training data into cases where 100%, 75%, 50%, and 25% of the entire intent were used. The test set includes a top utterance test set and a evenly distributed test set. The top portion utterance test set includes test sets similar to the domain ratio of the entire utterance data. The evenly distributed test set includes the same number of test sets for each piece of intent. Table 1 shows the accuracy performance of the task of the intent classifier that distinguishes the IND and the OOD in an exemplary embodiment of the present disclosure based on a large-scale language model. When a large-scale language model is used, even when 100% of the intent label examples are provided using a few shots, it is not possible to match all pieces of the intent. However, the performance degradation is small even when a small number of intent label examples are shown.

The new intent estimation unit 230 may sample representative sentences for each cluster from the data set classified as OOD by the intent determination unit (S310).

The new intent estimation unit 230 may perform contrastive learning and clustering between labels. The new intent estimation unit 230 may select a cluster that includes the most samples among the clusters that are not included in the entire intent set. The new intent estimation unit 230 may select a representative sentence of the cluster.

The automated determination unit 250 may detect new intent using a large-scale language model (S320). The automated determination unit 250 may detect new intent using representative sentences of a cluster. The automated determination unit 250 may find true-negative IND utterances in OOD data.

The prompt generation unit 240 may adjust an intent usage ratio from the entire data set and adjust an utterance example sampling ratio to generate a prompt for generating new intent.

In an exemplary embodiment of the present disclosure, representative utterances of each cluster were selected from 19,461 OOD sentences. Accordingly, the prompts were set to simultaneously perform the discovery of existing intent or new intent from a total of 161 sentences. The large-scale language model was provided with an intent label as an exemplary embodiment of the present disclosure, intent classification was performed on a new utterance, and a new intent label was generated when it was determined that it was not included in the existing intent. The large-scale language model was not significantly affected by changing the amount of intent label examples. On average, about 14% was classified as IND, and the remaining 86% was predicted as a new intent label. Since the OOD data set does not have a correct label, the prediction results were evaluated by two human evaluators. As a result, the new intent label was determined to be usable with 80% of accuracy. In total, 67% of the utterances classified as IND were classified correctly. The Cohen's Kappa coefficient, which may be used to determine the reliability of the two evaluators, is 0.741.

The re-learning unit 260 may train the intent classifier or large-scale language model of the automatic learning apparatus based on the newly generated intent label (S330). Furthermore, the re-learning unit 260 may train the intent classifier or large-scale language model based on a scout IND utterance.

The re-learning unit 260 may evaluate the intent classification performance based on the evaluation data (S340). The re-learning unit 260 may repeat the learning within the range where the intent classification performance for the predefined intent does not decrease, and may stop the learning when the classification performance decreases. The re-learning unit 260 may gradually include important clusters as new intent labels one by one to reduce the number of pieces of unknown intent. The re-learning unit 260 may repeat the learning infinitely until all pieces of data is processed.

Figure 4:
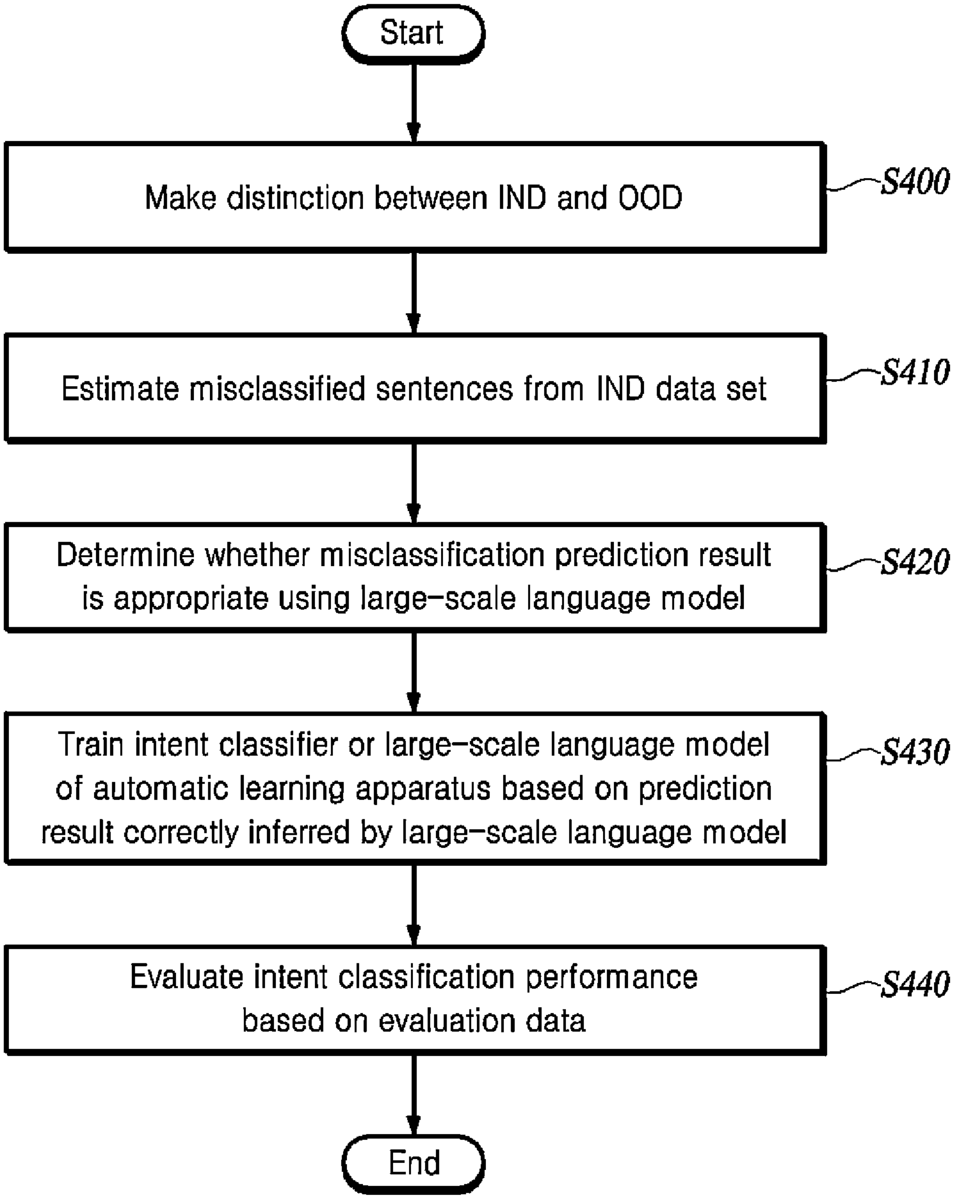
FIG. 4 is a flowchart illustrating a process of determining misclassification according to an exemplary embodiment of the present disclosure.

FIG. 4 is a flowchart illustrating a process of determining misclassification according to an exemplary embodiment of the present disclosure.

The intent determination unit 210 receives a utterance of a user and makes a distinction between the IND and the OOD (S400). The task of making a distinction between the IND and the OOD may be performed using an intent classifier or a large-scale language model.

The prompt generation unit 240 may be configured to generate a prompt to improve the intent classification performance of making a distinction between the IND and the OOD. The prompt generation unit 240 may adjust the intent usage ratio from the candidate group data set and adjust the utterance example sampling ratio to generate a prompt for intent classification.

The misclassification candidate group selection unit 220 may estimate misclassified sentences from the data set classified as the IND by the intent determination unit (S410).

The misclassification candidate group selection unit 220 may include one or more intent classifiers. Herein, the intent classifier means an intent classifier that has been pre-trained in different ways. The misclassification candidate group selection unit 220 may perform intent prediction from the same input sentence by connecting one or more trained intent classifiers in parallel. The misclassification candidate group selection unit 220 may evaluate how diverse the prediction results are according to the same input sentence and sort the prediction results based on the diversity of the intent distribution. The misclassification candidate group selection unit 220 may compare the prediction results of different intent classifiers and select misclassification candidate groups that are likely to cause errors.

In an exemplary embodiment of the present disclosure, three intent sets n1, n2, and n3 were generated from the entire intent set N. The entire intent set N is the set of all pieces of intent that the system may understand and process. The intent sets n1, n2, and n3 contain important intent, but each includes other, less important intent. Herein, the important intent refers to intent which is common to all data sets. The misclassification candidate group selection unit 220 trained one or more intent classifiers using the intent sets n1, n2, and n3 as data sets. Accordingly, the predicted results using the intent classifiers were sorted based on the diversity of the intent distribution. The sentences that obtained the most diverse results were selected as misclassification candidate groups.

In an exemplary embodiment of the present disclosure, as a result of performing the prediction, out of the entire data set containing 161,843 utterances, 5,746 (3.55%) utterances had mismatched intent classifier results. Among these, after excluding the differences caused by different trained intent, data in which the intent classifier was confused was found in 2,320 cases (1.43%) of utterances.

The automated determination unit 250 may be configured to determine whether the misclassification prediction result is appropriate using a large-scale language model (S420). The large-scale language model of the automated determination unit 250 may receive sentence data with a high possibility of misclassification and the prediction result of the intent classifier and determine the relationship between the actual meaning of the utterance and the prediction result. The automated determination unit 250 may analyze the meaning of the utterance and utilize the result as a prompt.

In an exemplary embodiment of the present disclosure, the selected 2,320 misclassification candidate group utterances were divided into three groups and the prediction result of the intent classifier was evaluated using a large-scale language model. The misclassification candidate group utterances were divided based on utterance frequency. The three groups include Group A (395 utterances) with utterances more than 100 times, Group B (1,348 utterances) with utterances more than 30 times but less than 100 times, and Group C (577 utterances) with utterances less than 30 times. A hundred samples were randomly extracted from each group, and the results of the intent classifier were determined using a large-scale language model and the correct intent was inferred.

Table 2 shows the prediction results of the intent classifier, the results correctly inferred by the large-scale language model, and the results evaluated by human evaluators.

TABLE 2

| Utterance | Intent 1 | Intent 2 | Intent 3 | LLM | Human |
|---|---|---|---|---|---|
| Fine dust | WeatherCheckDust | naviSearchPoi | weatherCheck | weatherCheckDust | 1 |
| Stop | naviSearch Poi | avntExit | avntStop | avntStop | 1 |
| Melon | naviSearchPoi | avntGoto | musicPlay | musicPlay | 1 |
| Air conditioner | naviSearchPoi | onFatcAircon | Others | controlAircon | 1 |
| Ha ha ha | naviSearchPoi | chitchatExclamation | Others | Laughter | 0 |
| Fortune | naviSearchPoi | portalSearch Fortune | portalSearchFortune | portalSearch Fortune | 1 |
| Roll up the passenger window | windowClosePassenger | closeWindow Position | windowClosePassenger | windowOpen Passenger | 1 |
| Ventilated seat | oncoolerSeat | naviSearchPoi | seatCooling | seatCooling | 1 |
| Turn down the air conditioner | fatcAirconOff | offFatcAircon | setDownWind | fatcAirconOff | 0 |
| Lower all windows | windowOpenAll | openWindow | windowOpenAll | openWindow | 0 |
| Turn off the TV | showoffCam | avntDMB | avntOffVolume | tvOff | 1 |
| Turn on the emerg ency lights | wheelHeatingOn | onWarmerSt. Wheel | Others | turnonHazar dlights | 1 |
| Wiper operation | settingsOn | onFatcAircon | Others | onWiper | 1 |
| Upbit bitcoin | portalSearchStock | naviSearchPoi | Others | cryptoCurrency Trade | 1 |
| Other route | avntReroute | avntRouteOption | avntResumeGuidance | avntReroute | 1 |

When the large-scale language model inferred correctly, 1 was entered in the Human column, and when the large-scale language model inferred incorrectly, 0 was entered.

Table 3 shows the matching ratio between human evaluators who evaluated the results.

TABLE 3

| | A | B | C |
|---|---|---|---|
| LLM Adjudicators | 0.81 | 0.83 | 0.91 |

As a result, the table shows a performance of average matching ratio of 85.46%. The table shows the result that the determination ability of a large-scale language model may imitate the determination ability of a human.

The re-learning unit 260 may train the intent classifier or the large-scale language model of the automatic learning apparatus based on the prediction result correctly inferred by the large-scale language model (S430).

The re-learning unit 260 may evaluate the intent classification performance based on the evaluation data (S440). The re-learning unit 260 may repeat the learning within the range where the intent classification performance for the predefined intent does not decrease, and may stop the learning when the classification performance decreases.

Figure 5:
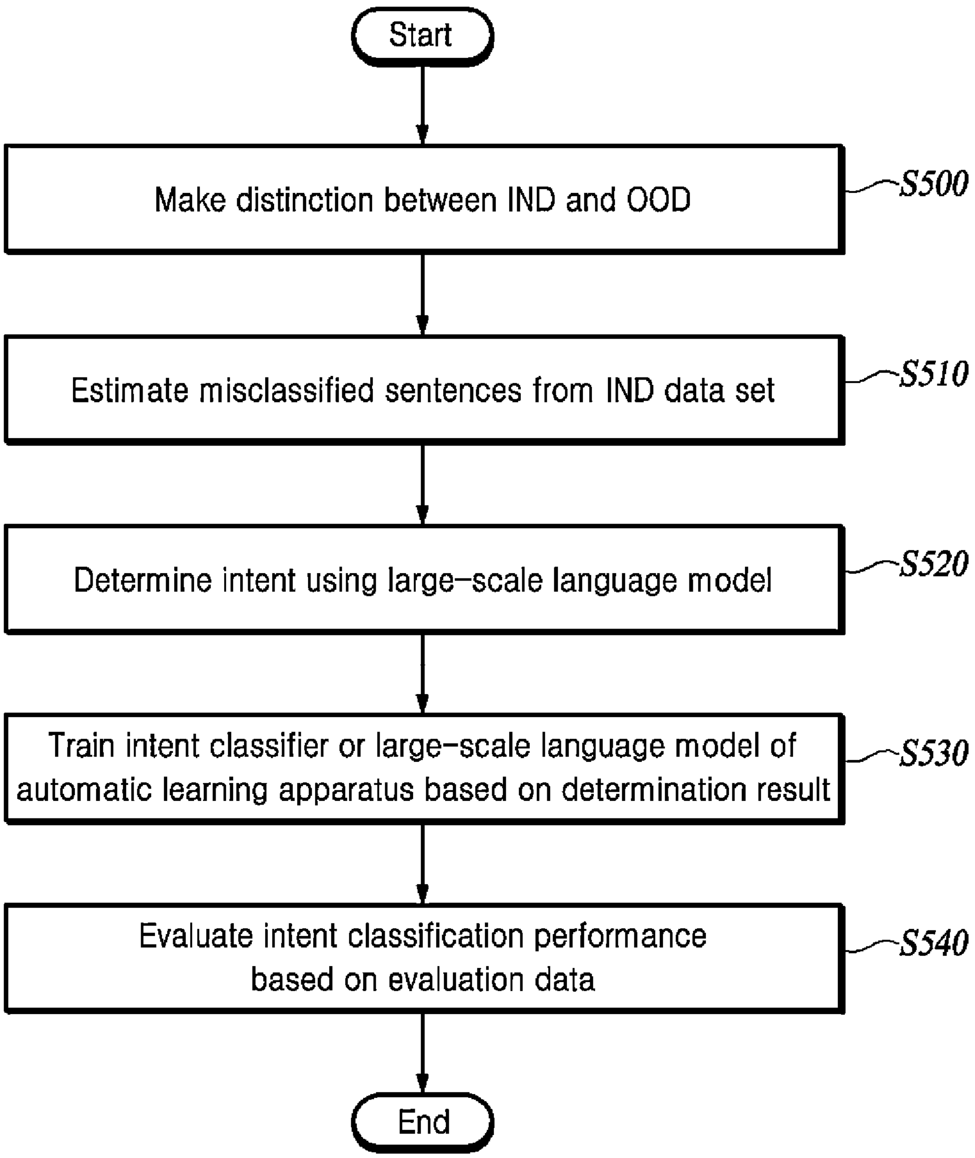
FIG. 5 is a flowchart of an intent analysis method according to an exemplary embodiment of the present disclosure.

FIG. 5 is a flowchart of an intent analysis method according to an exemplary embodiment of the present disclosure.

The intent determination unit 210 receives the data log of a user and makes a distinction between the IND and the OOD (S500).

The misclassification candidate group selection unit 220 may estimate misclassified sentences from data classified as the IND by the intent classifier or large-scale language model. Furthermore, the new intent estimation unit 230 may sample representative sentences for each cluster from data classified as the OOD by the intent classifier or large-scale language model (S510).

The automated determination unit 250 may be configured to determine whether the prediction result of the intent classifier is appropriate using the large-scale language model. Furthermore, the automated determination unit 250 may detect new intent using the large-scale language model (S520).

The re-learning unit 260 may train the intent classifier or large-scale language model of the automatic learning apparatus based on the result of the automated determination unit 250 (S530).

The re-learning unit 260 may evaluate the intent classification performance based on the evaluation data (S540).

Figure 6A:
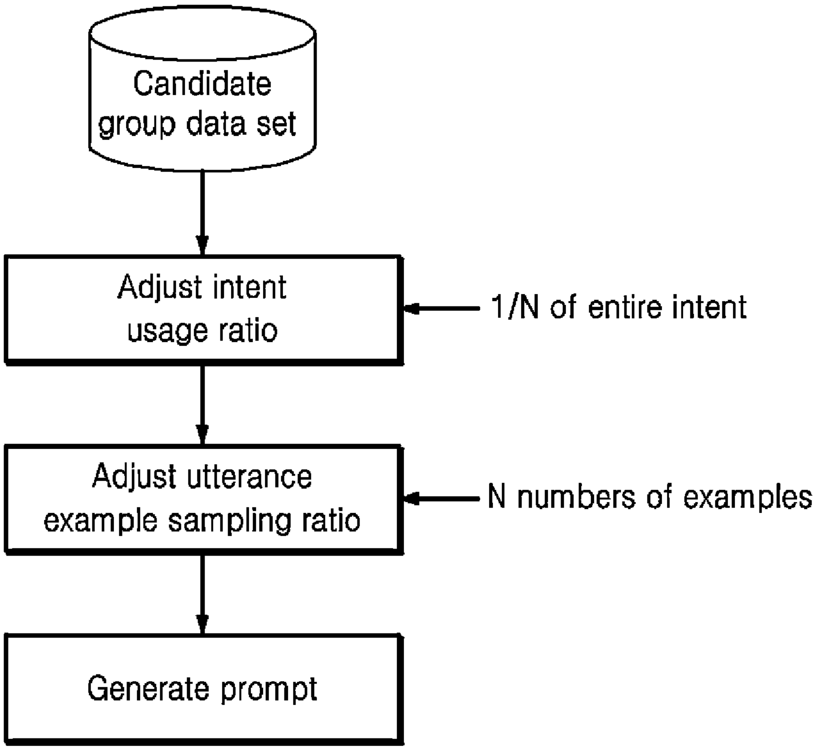
FIG. 6A and FIG. 6B are diagrams illustrating a method for performing effective prompting within a limited input size of a large-scale language model.
Figure 6B:
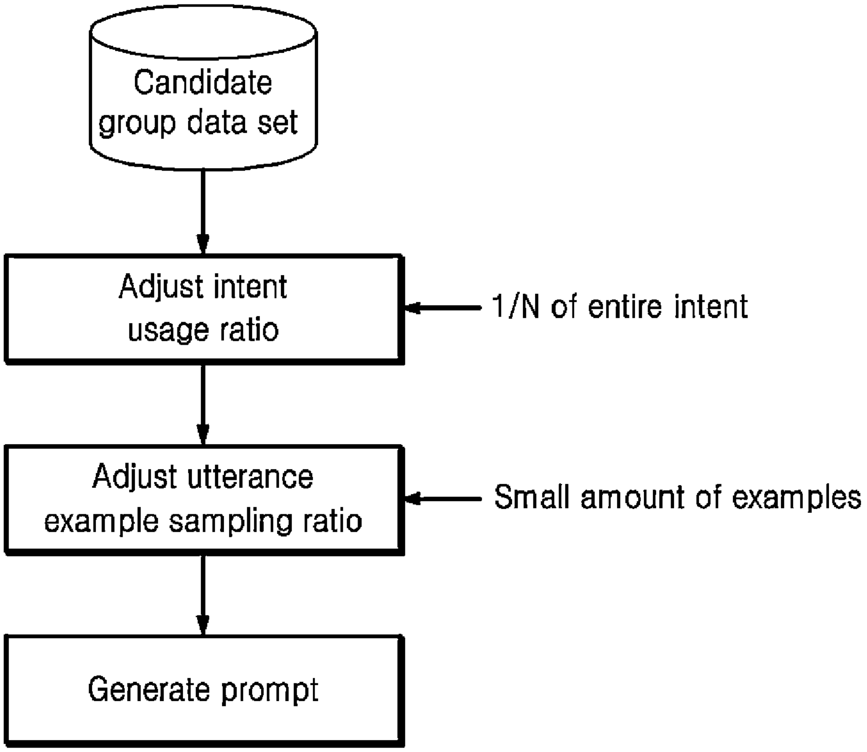

FIG. 6A and FIG. 6B are diagrams illustrating a method for performing effective prompting within a limited input size of a large-scale language model.

In a large-scale language model, the longer the length of the input and output tokens, the slower the generation speed. Accordingly, the method of using short prompts may improve the speed of new intent discovery and reduce costs. Furthermore, the performance of the intent classifier may be continuously improved by use of the automation of active learning.

FIG. 6A is a diagram illustrating a prompting method for effectively performing an intent classification task within a limited input size.

For a large-scale language model to predict the intent of a sentence, examples need to be provided using few-shot. A large-scale language model includes a limited input size (context size). The input size means the maximum number of tokens that the model may process at one time. Due to the limitation of the number of tokens, there is a limitation on a length of the input text. The prompt generation unit 240 may be configured to generate a prompt to improve the intent classification performance within a limited input size.

As an exemplary embodiment of the present disclosure, despite an input size of 16 k, the large-scale language model exceeded the input size limit when using 446 pieces of intent and 1 utterance sentence as an example. To address the present issue, the prompt generation unit 240 may be configured to generate a prompt for intent classification by adjusting the intent usage ratio from the candidate group data set and adjusting the utterance example sampling ratio. The generated prompt may include an example in which an utterance and intent form a pair, such as "utterance: intent." For example, the utterance "Open the window" and the intent "OpenWindow" may form a pair and include an example of "Open the window: OpenWindow."

The prompt generation unit 240 may use N utterance examples and generate a prompt of 100% of the input size while using 1/N of the entire intent.

The prompt generation unit 240 may use one utterance example and generate a prompt of 100% of the input size while using 100% of the entire intent. The method of using 100% of the entire intent may evenly classify all pieces of intent.

The prompt generation unit 240 may use two utterance examples and generate a prompt of 100% of the input size while using 50% of the entire intent. The method of using 50% of the entire intent may be advantageous when various pieces of intent are classified on average.

The prompt generation unit 240 may be configured to generate a prompt of 100% of the input size, for example, using 4 utterance examples and 25% of the entire intent. The method of using 25% of the entire intent may classify statistically frequently used intent well.

FIG. 6B is a drawing illustrating a prompting method for effectively generating new intent within a limited input size.

The prompt generation unit 240 may be configured to generate a prompt for generating new intent by adjusting the intent usage ratio from the entire data set and adjusting the utterance example sampling ratio.

The generated prompt may include an example in which an utterance and intent form a pair, such as "utterance: intent." For example, the utterance "Open the window" and the intent "OpenWindow" may form a pair and include an example of "Open the window: Open Window."

In an exemplary embodiment of the present disclosure, in the case of a task of classifying existing intent, a large number of examples are required, and in the case of a task of discovering new intent, sufficiently high accuracy may be achieved even with a small number of examples, such as 5%.

Figure 7:
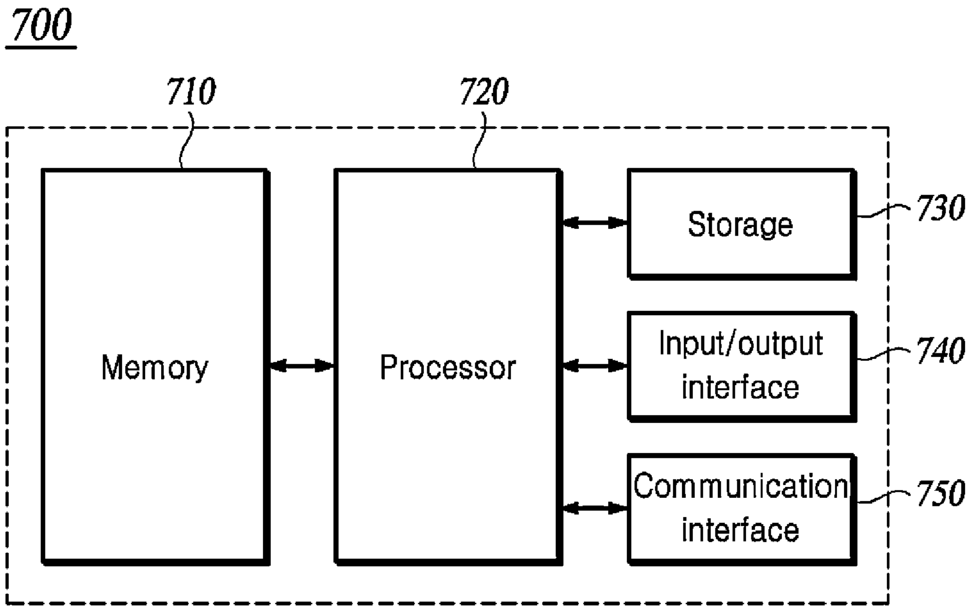
FIG. 7 is a block schematic diagram schematically illustrating an example computing device which may be used to implement a method or apparatus according to an exemplary embodiment of the present disclosure.

FIG. 7 is a block schematic diagram schematically illustrating an example computing device which may be used to implement a method or apparatus according to an exemplary embodiment of the present disclosure.

A computing device 700 may include all or part of a memory 710, a processor 720, a storage 730, an input/output interface 740, and a communication interface 750. The computing device 700 may structurally and/or functionally include at least a portion of the automatic learning apparatus 200. The computing device 700 may be a stationary computing device such as a desktop computer, a server, etc., as well as a mobile computing device such as a laptop computer, a smart phone, a vehicle electrical device, etc. The computing device 700 may be implemented as any specialized hardware accelerator configured for efficiently processing calculations for an artificial intelligence model. For example, the computing device 700 may include a graphic processing unit (GPU), a tensor processing unit (TPU), or a neural processing unit (NPU).

The memory 710 may store a program that causes the processor 720 to perform a method or operation according to various embodiments of the present disclosure. For example, the program may include a plurality of commands executable by the processor 720, and the above-described method or operation may be performed by executing the plurality of commands by the processor 720. The memory 710 may be a single memory or a plurality of memories. In the present connection, information required to perform the method or operation according to various embodiments of the present disclosure may be stored in a single memory or may be divided and stored in a plurality of memories. When the memory 710 is configured for a plurality of memories, the plurality of memories may be physically separated. The memory 710 may include at least one of a volatile memory and a nonvolatile memory. The volatile memory may include a static random access memory (SRAM) or a dynamic random access memory (DRAM), and the nonvolatile memory may include a flash memory, and the like.

The processor 720 may include at least one core configured for executing at least one command. The processor 720 may execute commands stored in the memory 710. The processor 720 may be a single processor or a plurality of processors.

The storage 730 maintains stored data even when power supplied to the computing device 700 is cut off. For example, the storage 730 may include nonvolatile memory, and may include storage media such as magnetic tape, optical disk, or magnetic disk. The program stored in the storage 730 may be loaded into the memory 710 before being executed by the processor 720. The storage 730 may store a file written in a program language, and a program generated from the file by a compiler or the like may be loaded into the memory 710. The storage 730 may store data to be processed by the processor 720 and/or data processed by the processor 720.

The input/output interface 740 may provide an interface with an input device such as a keyboard, a mouse, etc., and/or an output device such as a display device, a printer, etc. A user may trigger execution of a program by the processor 720 through an input device and/or check the processing result of the processor 720 through an output device. The communication interface 750 may provide access to an external network.

The computing device 700 may communicate with other devices through the communication interface 750.

Each component of the device or method according to an exemplary embodiment of the present disclosure may be implemented as hardware or software, or may be implemented as a combination of hardware and software. Furthermore, the function of each component may be implemented as software and a microprocessor may be implemented to execute the function of the software corresponding to each component.

Various embodiments of systems and techniques described herein may be realized with digital electronic circuits, integrated circuits, field programmable gate arrays (FPGAs), application specific integrated circuits (ASICs), computer hardware, firmware, software, and/or combinations thereof. The various embodiments may include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. Furthermore, the computer-readable recording medium may further include a transitory medium such as a data transmission medium. Furthermore, the computer-readable recording medium may be distributed over computer systems connected through a network, and computer-readable program code can be stored and executed in a distributive manner.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the computing device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well known to a person having ordinary knowledge in the art.

Furthermore, the terms such as "unit", "module", etc. included in the specification mean units for processing at least one function or operation, which may be implemented by hardware, software, or a combination thereof.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for automatically training a speech recognition system including one or more Natural Language Understanding (NLU) engines, the method comprising:

obtaining NLU results by connecting the one or more NLU engines trained in different ways in parallel;

generating a prompt for a large-scale language model based on comparing between/among the NLU results including sorting a sentence whose result of predicting intent is the most different;

determining whether the NLU results are appropriate by use of the generated prompt for the large-scale language model; and training the speech recognition system by use of a determination result.

2. The method of claim 1, wherein the NLU results include at least one of intent or an entity obtained using the one or more NLU engines, and wherein the method further includes:

performing processing to provide results corresponding to the intent and entity of a user; and controlling a vehicle according to the results.

3. The method of claim 1, wherein the determining of whether the NLU results are appropriate includes determining whether the result of predicting the intent using the large-scale language model is appropriate and inferring correct intent.

4. The method of claim 3, wherein the training of the speech recognition system by use of the determination result includes training the speech recognition system based on a result correctly inferred by the large-scale language model.

5. The method of claim 1, wherein the obtaining of the NLU results output by the one or more NLU engines includes performing label-to-label contrastive learning and clustering of the NLU results output by one or more trained NLU engines.

6. The method of claim 5, wherein the comparing between/among the NLU results includes sorting a cluster that includes the most samples among clusters that are not included in an entire intent set and selecting a representative sentence.

7. The method of claim 6, wherein the determining of whether the NLU results are appropriate includes detecting new intent and generating a new intent label by use of the representative sentence of the cluster.

8. The method of claim 7, wherein the training of the speech recognition system by use of the determination result includes training the speech recognition system based on a newly generated intent label.

9. An apparatus for automatically training a speech recognition system including one or more Natural Language Understanding (NLU) engines, the apparatus including:

a memory configured to store one or more instructions; and one or more processors operatively connected to the memory and configured to execute the one or more instructions stored in the memory, wherein the one or more processors, by executing the one or more instructions, perform:

obtaining NLU results by connecting the one or more NLU engines trained in different ways in parallel;

generating a prompt for a large-scale language model based on comparing between/among the NLU results including sorting a sentence whose result of predicting intent is the most different;

determining whether the NLU results are appropriate by use of the generated prompt for the large-scale language model; and training the speech recognition system by use of a determination result.

10. The apparatus of claim 9, wherein the NLU results include at least one of intent or an entity obtained using the one or more NLU engines, and wherein the one or more processors further perform:

processing to provide results corresponding to the intent and the entity of a user; and controlling a vehicle according to the results.

11. The apparatus of claim 9, wherein the training of the speech recognition system by use of the determination result includes training the speech recognition system based on a result correctly inferred by the large-scale language model.

12. The apparatus of claim 9, wherein the obtaining of the NLU results output by the one or more NLU engines includes performing label-to-label contrastive learning and clustering of the NLU results output by one or more trained NLU engines.

13. The apparatus of claim 12, wherein the comparing between/among the NLU results includes sorting a cluster that includes the most samples among clusters that are not included in an entire intent set and selecting a representative sentence.

14. The apparatus of claim 13, wherein the determining of whether the NLU results are appropriate includes detecting new intent and generating a new intent label by use of the representative sentence of the cluster.

15. The apparatus of claim 14, wherein the training of the speech recognition system by use of the determination result includes training the speech recognition system based on a newly generated intent label.

* * * * *